United States Patent

Kitano et al.

[11] Patent Number: 5,996,521
[45] Date of Patent: Dec. 7, 1999

[54] LARGE-SCALE COLUMNAR STRUCTURE MADE OF A FIBER REINFORCED PLASTIC

[75] Inventors: Akihiko Kitano; Masanobu Kobayashi; Motoi Ito, all of Ehime-ken, Japan

[73] Assignee: Toray Industries, Inc., Tokyo, Japan

[21] Appl. No.: 08/983,580

[22] PCT Filed: May 15, 1997

[86] PCT No.: PCT/JP97/01629

§ 371 Date: Jan. 16, 1998

§ 102(e) Date: Jan. 16, 1998

[87] PCT Pub. No.: WO97/43115

PCT Pub. Date: Nov. 20, 1997

[30] Foreign Application Priority Data

May 16, 1996 [JP] Japan ................................ 8-121522

[51] Int. Cl.⁶ .................................................. B63B 15/00
[52] U.S. Cl. ............................................................. 114/90
[58] Field of Search ........................................ 114/89, 90

[56] References Cited

U.S. PATENT DOCUMENTS

| | | | |
|---|---|---|---|
| 4,597,346 | 7/1986 | Pollard | 114/90 |
| 5,188,872 | 2/1993 | Quigley | 114/90 |
| 5,556,677 | 9/1996 | Quigley et al. | 114/90 |

*Primary Examiner*—Stephen Avila
*Attorney, Agent, or Firm*—Morrison & Foerster LLP

[57] ABSTRACT

A large-sized columnar body made of a fiber reinforced plastics materials (FRP) has three layers A, B and C in this order, respectively formed by a fiber reinforced plastics material consisting of continuous fibers and a resin, wherein the reinforcing fibers of the layer B are carbon fibers arranged in the longitudinal direction of the columnar body and that the reinforcing fibers of the layers A and C are carbon fibers and/or glass fibers arranged at ±50 to ±70 degrees with respect to the longitudinal direction of the columnar body. The large-sized columnar body made of FRP has a high compressive strength and hence can be lighter than conventional large-sized columnar bodies. Hence, it is suitable as a primary structural member used in buildings, structural components, aircraft, ships, and the like.

9 Claims, 1 Drawing Sheet

LARGE-SCALE COLUMNAR STRUCTURE MADE OF A FIBER REINFORCED PLASTIC

This application is based on International Application No. PCT/JP97/01629, filed May 15, 1997.

TECHNICAL FIELD

The present invention relates to a large-sized columnar body made of a fiber reinforced plastics material (hereunder abbreviated as FRP) consisting of reinforcing fibers and a resin, used as a primary structural member in buildings, structural components, aircraft, ships, etc.

BACKGROUND ARTS

A large-sized columnar body typically used as a mast of a racing yacht is required to have light weight, high rigidity and high strength, for securing the high speed stability, maneuverability and safety of the boat. In addition, aerodynamically for the necessity of high air releasability, a large-sized columnar body with a simple circular cross section is insufficient, and a large-sized columnar body with an ellipsoidal cross section or with a specific streamlined cross section selection of which is based on wind tunnel experiments is demanded.

A long and large columnar body generally called a pole must be tapered for the necessity of weight balance in the longitudinal direction.

As large-sized columnar bodies to meet these demands, those made of FRP are attracting attention in recent years, and are proposed in (1) Japanese Patent Laid-Open (Kokai) No. 57-60989, (2) Japanese Patent Laid-Open (Kokai) No. 59-63289, (3) Japanese Patent Laid-Open (Kokai) No. 4-255306, etc.

(1) Japanese Patent Laid-Open (Kokai) No. 57-60989 discloses a technique to reinforce the rigidity of a mast of a sling boat by letting the mast have a reinforcing portion swelling outside at least in either bow or stern direction. Furthermore, the patent gazette discloses a structure in which layers oriented in directions of ±20 to ±70 degrees with respect to the longitudinal axis of the mast are formed inside the reinforcing portion, for the purpose of improving the torsional rigidity of the mast.

(2) Japanese Patent Laid-Open (Kokai) No. 59-63289 discloses a mast made of FRP for surfing with a hollow cylindrical structure in which an intermediate layer with glass fibers and reinforcing fibers with a modulus higher than that of glass fibers is held between layers with glass fibers as reinforcing fibers.

(3) Japanese Patent Laid-Open (Kokai) No. 4-255306 discloses a large-sized columnar body in which two shells prepared by laying up unidirectional prepreg sheets consisting of carbon fibers and an epoxy resin are bonded in the longitudinal direction to form an integral structure.

In the meantime, FRP is low in compressive strength as compared with tensile strength, unlike metallic materials, and for this reason, when FRP is used as a large-sized columnar body, how to highly manifest the compressive strength of FRP is a key issue to achieve weight reduction. In other words, in most cases, the compressive strength decides the weight of a large-sized columnar body.

While all of the above patent gazettes (1) to (3) relate to large-sized columnar bodies made of FRP with light weight and high performance, the patent gazette (3) only describes that it is desirable to let a layer of 0 degree in fiber orientation degree account for 50% or more or, as required, to lay up a 45-degree layer or 90-degree layer in combination, as a means for improving the compressive strength of a large-sized columnar body.

The object of the present invention is to provide a large-sized columnar body made of FRP improved in compressive strength, and with lighter weight and higher safety.

DISCLOSURE OF THE INVENTION

The present invention relates to a large-sized columnar body made of a fiber reinforced plastics material, which has three layers [A], [B] and [C] respectively formed by a fiber reinforced plastics material consisting of continuous fibers and a resin, characterized in that the reinforcing fibers of the layer [B] are carbon fibers arranged in the longitudinal direction of the columnar body, and that the reinforcing fibers of the layers [A] and [C] are carbon fibers and/or glass fibers arranged at ±50 to ±70 degrees with respect to the longitudinal direction of the columnar body.

MOST PREFERRED EMBODIMENTS OF THE INVENTION

Figure 1:
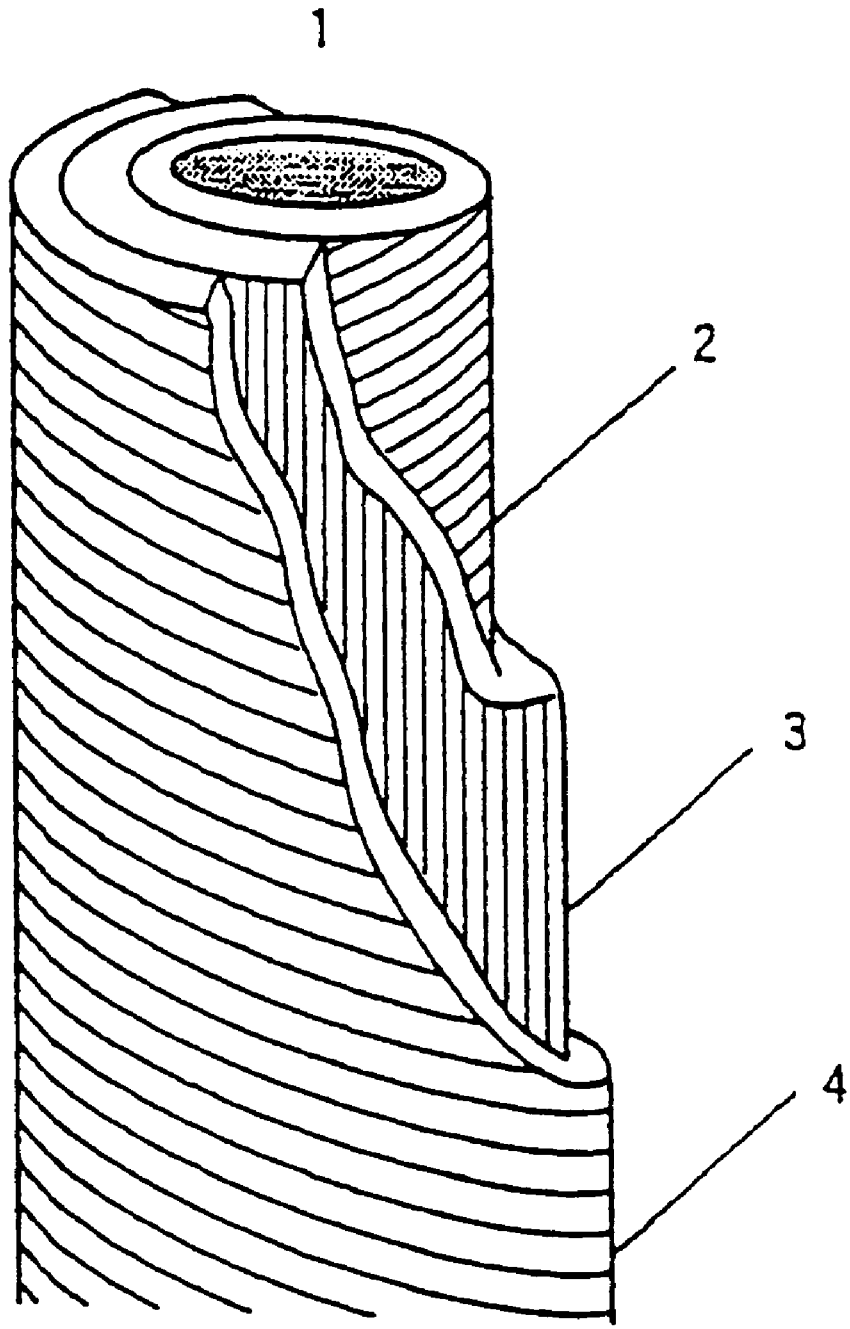
FIG. 1 is a schematic drawing showing an embodiment of the large-sized columnar body made of a fiber reinforced plastics material of the present invention. 1 . . . large-sized columnar body 2 . . . layer [A] 3 . . . layer [B] 4 . . . layer [C]

It is preferable that the large-sized columnar body of the present invention, as typically used as a mast of a yacht, has a length of about 1 m to 20 m and a width or thickness (the diameter of the largest circumscribed circle of cross section) of 30 mm to 1000 mm.

The cross sectional form of the large-sized columnar body can be various, for example, circular, ellipsoidal, triangular, oval or like a streamlined blade, and may have open holes and neck portions for connecting other parts. It is preferable that the cross section is hollow.

The reinforcing fibers of the layer [B] must be continuous carbon fibers to keep the large-sized columnar body lighter in weight.

In general, as the carbon fibers, mainly PAN based carbon fibers made from polyacrylonitrile or pitch based carbon fibers are used. The carbon fibers in the present invention can be either PAN based carbon fibers or pitch based carbon fibers. It is preferable that the carbon fibers have a modulus of 200 GPa to 700 GPa and a strength of 1 GPa to 10 GPa. The continuous fibers are usually long fibers with a fiber length of 1 m or more.

The resins which can be used here include thermosetting resins such as epoxy resins, vinyl ester resins, unsaturated polyester resins, phenol resins, polyimide resins and polyurethane resins, thermoplastic resins such as polyethylene resins, nylon resins, polypropylene resins, polyamide resins, ABS resins, polybutylene terephthalate resins, polyacetal resins and polycarbonate resins, etc. For enhancing the compressive strength of the large-sized columnar body, a resin with a modulus of 3 GPa or more is preferable. The modulus of a resin in this case is measured according to JIS K 7113.

When a large and long columnar body is used in contact with sea water like a mast of a sailing boat or yacht, etc., it is preferable to use a vinyl ester resin or polyester resin excellent in corrosion resistance, or a resin mainly composed of it.

It is preferable that the weight fraction of the reinforcing carbon fibers in the resin is 45% to 85%, for more highly manifesting the strength and modulus of the reinforcing fibers in the resin. If the fraction is less than 45%, the amount of resin is too much to obtain the effect of weight reduction, and if more than 85%, the resin is not sufficiently diffused around the fibers, so that the stress transfer efficiency between fibers is lowered. Having regard to processability, it is more preferable that the weight fraction of the reinforcing carbon fibers in the resin is 55% to 75%.

It is also preferable that the carbon fibers are treated on the surfaces or contain a sizing agent for better adhesion to the resin.

Ideally it is preferable that the continuous carbon fibers in the layer [B] are arranged in the longitudinal direction of the large-sized columnar body, but actually if they are arranged within ±5 degrees with respect to the longitudinal axis of the large-sized columnar body, there is no problem.

If the large-sized columnar body is a mast of a sailing boat or yacht, it must have a certain rigidity for higher maneuverability. Hence, it is preferable that the carbon fibers of the layer [B] have a modulus of 350 GPa or more.

If the layer [B] is arranged more outwardly of the columnar body, the bending rigidity of the columnar body increases. If it is necessary to further enhance the bending rigidity, the cross sectional form of the columnar body can be modified as far as the aerodynamic drag, etc. are not lowered. For example, the wall thickness can be increased to increase the geometrical moment of inertia around the axis requiring the rigidity, or as stated in Japanese Patent Laid-Open No. 57-60989, reinforcing protrusions can also be provided.

It is important that the [A] layer 2 and the [C] layer 4 exist inside and outside the [B] layer 3 respectively adjacently to the [B] layer 3.

The layers [A] and [C] contain continuous carbon fibers or glass fibers, and the fibers are arranged in directions of ±50 to ±70 degrees with respect to the axis of the large-sized columnar body. This is intended to support the layer [B] from both sides, to enhance the compressive strength of the layer [B]. If the orientation angles are smaller than ±50 degrees, delamination from the layer [B] occurs, and if larger than ±70 degrees, the supporting layers must be thicker, to increase the weight of the large-sized columnar body. A more preferable angle range is ±55 to ±75 degrees, and the most preferable angles are about ±60 degrees.

Japanese Patent Publication (Kokoku) No. 57-60989 discloses a technique in which layers with fibers arranged in directions of ±20 to ±70 degrees are formed inside a reinforcing portion provided to swell in the bow or stem direction in a cylindrical mast for the purpose of improving the torsional rigidity. In the present invention, the existence of the reinforcing portion is not necessarily required, and layers with continuous fibers arranged in directions of ±50 to ±70 degrees exist inside and outside the 0-degree layer (layer [B] ), to enhance the compressive strength of the 0-degree layer and furthermore to enhance the compressive strength of the large-sized columnar body.

In the present invention, it is preferable that the thickness ratio of the layer [B] to the layer [A] ([B]:[A]) and the thickness ratio of the layer [B] to the layer [C] ([B]:[C]) are 1:0.05 to 1:0.4. If the ratio is less than 1:0.05, the above mentioned effect of supporting the layer [B] is not remarkable, and if more than 1:0.4, the weight increases so that the effect of reducing the weight of the large-sized columnar body is lowered, although the supporting effect is sufficient. Having regard to the balance between the supporting effect and the weight reduction effect, it is preferable that [B]:[A] and [B]: and [C] are 1:0.1 to 1:0.3. It is of course not necessary that the thickness of [A] is equal to that of [C], but having regard to symmetry, it is preferable that both the thicknesses are almost equal.

It is further more preferable that the layer [A] or [C] is a biaxially fiber oriented layer in which the same quantities of fibers are arranged in the + direction and the − direction in the layer. For example, the layer [A] or [C] can be a layer with respectively one or more prepreg sheets arranged at ±θ(50 degrees≦θ≦70 degrees), or ±θ sheets (50 degrees≦θ≦70 degrees) formed simultaneously by FW, or cloth sheets arranged in two directions (directions of ±50 to ±70 degrees).

Therefore, strictly, each of the layer [A] and the layer [C] can be said to be a mono-layer or multi-layer in which continuous reinforcing fibers are arranged within a range of ±50 degrees to ±70 degrees regularly or irregularly.

Of course the ±θ sheet and the −θ sheet of the multi-layer [A] and/or the multi-layer [C] are not required to be equal in quantity, but having regard to symmetry, it is preferable that the ±θ sheets are almost equal in quality.

If the large-sized columnar body is a mast of a sailing boat or yacht, it is effective that the orientation angle is ±50 to ±55 degrees for letting the layer [A] or [C] have the effect of enhancing the torsional rigidity of the large-sized columnar body. It is more preferable that with the thickness ratio of the layer [A] or [C] kept small, for example, ±45-degree sheets are provided adjacently to the layer [A] or [C], to enhance the torsional rigidity of the large-sized columnar body.

The reinforcing fibers of the layer [A] or [C] are carbon fibers or glass fibers. In the case of carbon fibers, PAN based or pitch based carbon fibers are preferable, as in the layer [B], and in the case of a large-sized columnar body, carbon fibers with a modulus of 300 GPa or more are preferable since the torsional rigidity of the large-sized columnar body can be enhanced.

As the glass fibers, fibrous glass with silicon oxide ($SiO_2$) as the main component such as E glass, C glass or S glass can be preferably used, and it is preferable that the fiber diameter is about 5 to 20 μm. Furthermore, in the present invention, E glass with higher universality or S glass with higher strength is preferable. It is desirable that, as is also the case for carbon fibers, the glass fibers are treated on the surfaces or contain a sizing agent for higher compatibility with the resin.

Japanese Patent Laid-Open (Kokai) No. 59-63289 discloses a mast for surfing, in which both the inner and outer layers are formed by glass fibers while the intermediate layer is reinforced by combining glass fibers and fibers higher in modulus than glass fibers such as carbon fibers. According to the patent gazette, the intermediate layer contains glass fibers, and furthermore the fibers of the intermediate layer are arranged at 8 to 30 degrees. Hence, the technique is not sufficiently able to enhance the compressive strength of a large-sized columnar body. Moreover, the glass fibers arranged on both sides of the intermediate layer are used for keeping the bending rigidity of the mast lower than that achieved by using carbon fibers, but the layers [A] and [C] of the present invention are used for enhancing the compressive strength of the layer [B] used as an intermediate layer.

Japanese Patent Laid-Open (Kokai) No. 4-255306 discloses a large-sized columnar body, in which unidirectionally parallel prepreg sheets consisting of high performance carbon fibers and an epoxy resin, of 50 to 70% in fiber content by volume and a ratio of 50% or more in fiber orientation of 0-degree are laminated and molded in the longitudinal direction by an outer mold into two shells to be integrated into the columnar body by bonding in the longitudinal direction In the present invention, unlike the above technique, it is not necessary to split the columnar body into two shells to be integrated. On the contrary, splitting into two shells is not preferable since it cuts the fibers, thus remarkably lowering the compressive strength of the large-sized columnar body. Furthermore, the patent gazette proposes the use of a 0-degree layer and a 45-degree layer or 90-degree layer in combination as a method for enhancing the compressive strength considered to be remarkably lowered by splitting into two shells. In addition, in the present invention, in addition to the layers [A] and [C] with fibers arranged in a range of ±50 to ±70 degrees, a 45-degree layer can be used for enhancing the torsional rigidity or a 90-degree layer can be used for enhancing the strength and rigidity in the diameter direction of the large-sized columnar body without any problem.

The present invention has been described, mainly considering the application as a mast of a sailing boat or yacht. However, the effect of the present invention can be manifested also as primary structural members used in buildings (columns and poles of office buildings, dwelling houses, cottages, etc., supports of pedestals and benches, etc.), structural components (electric wire poles, street lamp poles, supports of signs, displays, guard rails, etc., shafts and shaft covers for oil drilling, pipelines for transporting fluids such as oil and gas, poles of wind power generators, etc.), other poles (poles for sports such as volley ball and high jump), and aircraft, hulls, etc.

For forming into the large-sized columnar body of the present invention, any the publicly known forming method can be used. The forming methods which can be used here include, for example, filament winding (FW), sheet winding, sheet lay-up, sheet wrapping, tape winding, tape wrapping, hand lay-up, sheet molding process (SMC), stamping molding, resin injection, pultrusion, pull wind process, scrip process, etc. In the forming into the large-sized columnar body, it is preferable to form the [A], [B] and [C] layers integrally all at once, but if it is thick, multi-step (sequential) forming can be effected. As a further alternative method, layers formed separately can be bonded.

EXAMPLE 1

Around a steel mandrel with a diameter of 70 mm, sixteen epoxy resin prepreg sheets (respectively with a thickness of 145 $\mu$m and an areal fiber unit weight of 150 g/m$^2$) in which carbon fibers T700S (with an ultimate strain of 2.0%, modulus of 230 GPa and diameter of 7 $\mu$m) made by Toray Industries, Inc. were arranged in one direction were wound. In this case, the sixteen sheets were arranged, to specify from the mandrel side, as one sheet in 60-degree direction, one sheet in −60-degree direction, twelve sheets in 0-degree direction, one sheet in −60-degree direction and one sheet in 60-degree direction. They were hardened in an oven with 130° C. as the highest temperature for 2 hours, to obtain a large-sized columnar body with a lay-up configuration of [60/−60/0$_{12}$/−60/60] and a wall thickness of 2.32 mm. The ratio of the ±60-degree sheets (on one side) to the 0-degree sheets was 0.17.

Both the ends of the large-sized columnar body were adhesively bonded to steel cylinders, to conduct a compression test at a gauge length of 200 mm. The compressive strength was as shown in Table 1.

EXAMPLE 2

A large-sized columnar body was obtained as described in Example 1, except that 50-degree sheets were used instead of the 60-degree sheets and that −50-degree sheets were used instead of the −60-degree sheets. The result of a compression test conducted as described in Example 1 was as shown in Table 1.

EXAMPLE 3

A large-sized columnar body was obtained as described in Example 1, except that 70-degree sheets were used instead of the 60-degree sheets and that −70-degree sheets were used instead of the −60-degree sheets. The result of a compression test conducted as described in Example 1 was as shown in Table 1.

EXAMPLE 4

A large-sized columnar body with a wall thickness of 2.90 mm was obtained as described in Example 1, except that the lay-up configuration was [(60)$_2$/(−60)$_2$/0$_{12}$/(−60)$_2$/(60)$_2$] formed by using four 60-degree sheets and four −60-degree sheets. The result of a compression test conducted as described in Example 1 was as shown in Table 1.

EXAMPLE 5

A large-sized columnar body with a wall thickness of 2.90 mm was obtained as described in Example 1, except that the lay-up configuration was [60/(−60)$_3$/0$_{12}$/(−60)$_3$/60] formed by using two 60-degree sheets and six −60-degree sheets. The result of a compression test conducted as described in Example 1 was as shown in Table 1.

EXAMPLE 6

A large-sized columnar body with a wall thickness of 1.94 mm was obtained as described in Example 1, except that the prepreg sheets used for the 60-degree sheets and −60-degree sheets respectively had a thickness of 25 $\mu$m and an areal fiber unit weight of 25 g/m$^2$. The result of a compression test conducted as described in Example 1 was as shown in Table 1.

EXAMPLE 7

A large-sized columnar body with a wall thickness of 2.08 mm was obtained as described in Example 1, except that respectively two prepreg sheets respectively with a thickness of 25 $\mu$m and an areal unit weight of 25 g/m$^2$ (four sheets in total) were used instead of the one 60-degree sheet and the one −60degree sheet corresponding to the layer [C]. The result of a compression test conducted as described in Example 1 was as shown in Table 1.

COMPARATIVE EXAMPLE 1

A large-sized columnar body was obtained as described in Example 6, except that 45-degree sheets were used instead of the 60-degree sheets and that −45-degree sheets were used instead of the −60-degree sheets. The result of a compression test conducted as described in Example 6 was as shown in Table 1.

COMPARATIVE EXAMPLE 2

A large-sized columnar body was obtained as described in Example 6, except that 85-degree sheets were used instead of the 60-degree sheets and that −85-degree sheets were used instead of the −60-degree sheets. The result of a compression test conducted as described in Example 6 was as shown in Table 1.

EXAMPLE 8

A large-sized columnar body with a wall thickness of 1.94 mm was obtained as described in Example 1, except that the diameter of the mandrel was 40 mm. The result of a compression test conducted as described in Example 1 at a gauge length of 150 mm was as shown in Table 2.

COMPARATIVE EXAMPLE 3

A large-sized columnar body with a wall thickness of 1.94 mm was obtained as described in Example 8, except that 85-degree sheets were used instead of the 60-degree sheets and that −85-degree sheets were used instead of the −60-degree sheets. The result of a compression test conducted as described in Example 8 was as shown in Table 2.

EXAMPLE 9

Around a steel mandrel with a diameter of 70 mm, a strand (consisting of 12000 filaments) of carbon fibers T700S (with an ultimate strain of 2.0%, modulus of 230 GPa and diameter of 7 $\mu$m) produced by Toray Industries, Inc. impregnated with phenol resin was wound in a configuration of [±60/±30/±60], and hardened in a 130° C. oven, to obtain a large-sized columnar body with a wall thickness of 2.32 mm. The ratio of the ±60-degree sheets (on one side) to the 0-degree sheets was 0.15.

Both the ends of the large-sized columnar body were adhesively bonded to steel cylinders, and a compression test was conducted at a gauge length of 200 mm. The compressive strength was as shown in Table 3.

EXAMPLE 10

A large-sized columnar body with a wall thickness of 2.46 mm was obtained as described in Example 9, except that the ±60-degree sheets were formed by a strand (consisting of 6900 filaments) of glass fibers (with a modulus of 70 GPa and diameter of 13 $\mu$m). The result of a compression test conducted as described in Example 9 was as shown in Table 3.

COMPARATIVE EXAMPLE 4

A large-sized columnar body with a wall thickness of 2.32 mm was obtained as described in Example 9, except that ±88-degree sheets were used instead of the ±60-degree sheets. The result of a compression test conducted as described in Example 9 was as shown in Table 3.

TABLE 1

Compression test results of sheet-wound large-sized columnar bodies (with an inner diameter of 70 mm)

| | Orientation angle (degrees) | | | Layer thickness ratio | | Compressive load |
|---|---|---|---|---|---|---|
| | [A] | [B] | [C] | [B]:[A] | [B]:[C] | kN |
| Example 1 | ±60 | 0 | ±60 | 1:0.17 | 1:0.17 | 4.53 |
| Example 2 | ±50 | 0 | ±50 | 1:0.17 | 1:0.17 | 4.30 |
| Example 3 | ±70 | 0 | ±70 | 1:0.17 | 1:0.17 | 4.24 |
| Example 4 | ±60 | 0 | ±60 | 1:0.33 | 1:0.33 | 4.58 |
| Example 5 | ±60 | 0 | ±60 | 1:0.33 | 1:0.33 | 4.37 |
| Example 6 | ±60 | 0 | ±60 | 1:0.06 | 1:0.06 | 4.14 |

TABLE 1-continued

Compression test results of sheet-wound large-sized columnar bodies (with an inner diameter of 70 mm)

| | Orientation angle (degrees) | | | Layer thickness ratio | | Compressive load |
|---|---|---|---|---|---|---|
| | [A] | [B] | [C] | [B]:[A] | [B]:[C] | kN |
| Example 7 | ±60 | 0 | ±60 | 1:0.17 | 1:0.06 | 4.19 |
| Comparative Example 1 | ±45 | 0 | +45 | 1:0.06 | 1:0.06 | 3.70 |
| Comparative Example 2 | ±85 | 0 | ±85 | 1:0.06 | 1:0.06 | 3.75 |

TABLE 2

Compression test results of sheet-wound large-sized columnar bodies (with an inner diameter of 40 mm)

| | Orientation angle (degrees) | | | Layer thickness ratio | | Compressive load |
|---|---|---|---|---|---|---|
| | [A] | [B] | [C] | [B]:[A] | [B]:[C] | kN |
| Example 8 | ±60 | 0 | ±60 | 1:0.17 | 1:0.17 | 3.50 |
| Comparative | ±85 | 0 | ±85 | 1:0.17 | 1:0.17 | 3.24 |

TABLE 3

Compression test results of filament-wound large-sized columnar bodies (with an inner diameter of 70 mm)

| | Orientation angle (degrees) | | | Layer thickness ratio | | Compressive load |
|---|---|---|---|---|---|---|
| | [A] | [B] | [C] | [B]:[A] | [B]:[C] | kN |
| Example 9 | ±60 | ±3 | ±60 | 1:0.15 | 1:0.15 | 4.35 |
| Example 10 | ±60 | ±3 | ±60 | 1:0.19 | 1:0.19 | 4.38 |
| Comparative | ±88 | ±3 | ±88 | 1:0.15 | 1:0.15 | 4.01 |

INDUSTRIAL APPLICABILITY

As described above, the large-sized columnar body made of a fiber reinforced plastics material of the present invention has at least three adjacent layers [A], [B] and [C] respectively formed by a fiber reinforced plastics material consisting of continuous reinforcing fibers and a resin. The reinforcing fibers of the layer [B] are carbon fibers arranged in the longitudinal direction of the columnar body, and the reinforcing fibers of the layers [A] and [C] are carbon fibers or glass fibers arranged at ±50 to ±70 degrees with respect to the longitudinal direction of the columnar body. Thus, the large-sized columnar body has a high compressive strength, and hence can have a weight lighter than those of conventional large-sized columnar bodies.

We claim:

1. A large-sized columnar body made of a fiber reinforced plastics material, comprising three layers A, B and C in this order, each layer being formed of a fiber reinforced plastics material comprising continuous fiber and a resin,
    wherein the reinforcing fibers of layer B consist of carbon fibers arranged in a longitudinal direction of the columnar body and the reinforcing fibers of layers A and C are carbon fibers and/or glass fibers arranged at an angle of ±55 to ±65 degrees with respect to the longitudinal direction of the columnar body,
    the thickness ratio of the layers A, B and C defined as the ratio A:B:C is 0.05 to 0.4:1:0.05 to 0.4.

2. A large-sized columnar body made of a fiber reinforced plastics material, comprising three layers A, B and C in this order, each layer being formed of a fiber reinforced plastics material comprising continuous fiber and a resin, wherein the reinforcing fibers of layer B consist of carbon fibers arranged in a longitudinal direction of the columnar body and the reinforcing fibers of layers A and C are carbon fibers and/or glass fibers arranged at an angle of ±50 to ±70 degrees with respect to the longitudinal direction of the columnar body, the thickness ratio of the layers A, B and C defined as the ratio A:B:C is 0.05 to 0.4:1:0.05 to 0.4.

3. A large-sized columnar body made of a fiber reinforced plastics material, comprising three layers A, B and C in this order, each layer being formed of a fiber reinforced plastics material comprising continuous fiber and a resin, wherein the reinforcing fibers of layer B consist of carbon fibers arranged in a longitudinal direction of the columnar body and the reinforcing fibers of layers A and C are carbon fibers and/or glass fibers arranged at an angle of ±50 to ±70 degrees with respect to the longitudinal direction of the columnar body, the thickness ratio of the layers A, B and C defined as the ratio A:B:C is 0.1 to 0.3:1:0.1 to 0.3.

4. A large-sized columnar body made of a fiber reinforced plastics material according to claim 2, wherein the reinforcing fibers of the layers A and C are carbon fibers.

5. A large-sized columnar body made of a fiber reinforced plastics material according to claim 4, wherein the reinforcing fibers of the layers A, B and C have a weight fraction of 45 to 85%.

6. A large-sized columnar body made of a fiber reinforced plastics material according to claim 4, wherein the weight fraction of the reinforcing fibers of the layers A, B and C is 55 to 75%.

7. A large-sized columnar body made of a fiber reinforced plastics material, according to any one of claims 1, 2, 3 and 6, wherein the large-sized columnar body is a mast of a yacht or sailing boat.

8. A large-sized columnar body made of a fiber reinforced plastics material, according to any one of claims 1 and 4–6, wherein the carbon fibers of the layer B have a modulus of 350 GPa or more and the reinforcing fibers of the layers A and C are carbon fibers with a modulus of 300 GPa or more.

9. A large-sized columnar body made of a fiber reinforced plastics material according to claim 2, wherein the cross section is hollow.

* * * * *